United States Patent [19]

Davis et al.

[11] 4,152,267

[45] May 1, 1979

[54] ROTARY DISC VACUUM FILTER

[75] Inventors: Steven S. Davis, Bountiful; Ralph O. Hawkes, Salt Lake City, both of Utah

[73] Assignee: Envirotech Corporation, Menlo Park, Calif.

[21] Appl. No.: 804,829

[22] Filed: Jun. 8, 1977

[51] Int. Cl.² .............................................. B01D 33/08
[52] U.S. Cl. .................................... 210/331; 210/345
[58] Field of Search ............... 210/345, 390, 392, 395, 210/397, 429, 430, 402, 404, 331

[56] References Cited

U.S. PATENT DOCUMENTS

| 1,538,980 | 5/1925 | Genter | 210/345 |
| 1,649,581 | 11/1927 | Genter et al. | 210/404 X |
| 3,220,554 | 11/1965 | Burchert et al. | 210/395 X |
| 3,255,888 | 6/1966 | Balfour | 210/395 |
| 3,291,312 | 12/1966 | Peterson | 210/345 |
| 3,471,026 | 10/1969 | Riker | 210/347 X |

Primary Examiner—Theodore A. Granger
Attorney, Agent, or Firm—Robert E. Krebs

[57] ABSTRACT

A rotary disc vacuum filter includes detachably-mounted conduits rotating with a trunnion to provide flow communication between disc-shaped filter elements mounted on the trunnion and a valve applying suction to the filter elements. The rotary disc vacuum filter further includes ferrules for mounting the disc-shaped filter elements to the trunnion.

9 Claims, 6 Drawing Figures

ROTARY DISC VACUUM FILTER

BACKGROUND

1. Field of Art

The present invention relates generally to pressure differential filtration, and in particular, to the structure of a rotary disc vacuum filter.

2. State of the Art

Rotary disc vacuum filters are well known in the art for separating suspended solids from a slurry. Typically, such filters have a tank to contain a slurry to be filtered; an elongated trunnion mounted to extend across the tank for rotation about a horizontal axis; and a plurality of disc-shaped filter elements comprised of wedge-shaped filter sectors, mounted at equally-spaced intervals along the trunnion to rotate with the trunnion into and out of the slurry in the tank. Further, such filters typically include a valve mounted to the tank in flow communication with the disc filter elements to selectively apply vacuum to the filter sectors of the disc filter elements.

Still further it is known to mount conduits on the exterior sidewall of the trunnion to provide flow communication between the valve and the filter sectors. Replaceability of these conduits is important in many applications because abrasive solids pass into the conduits with the filtrate and cause wear requiring replacement of the conduits within six months.

Various problems have been encountered when mounting conduits on the exterior sidewall of the trunnion in a manner facilitating replacement. For example, such problems include alignment of the filter elements with the conduits and alignment of the conduits with the trunnion and sealing the open end of the conduits from which the filtrate leaves the conduits. In one attempt to overcome the alignment problems, a plurality of fasteners are mounted along the conduits to fasten them to the trunnion. The plurality of fasteners are undesirable because of the time required to remove and reengage them. In another attempt to overcome both the alignment problems and sealing problems, a portion of the conduit is formed of flexible accordian-like material. The flexible portion is undesirable because the seals needed to connect the flexible portion to the conduit require time to remove and to replace and the material from which the flexible portion is made is itself susceptible to wear from the passage of abrasive solids.

Another problem encountered with conduits is with mounting the disc filter elements in flow communication with the conduits. It is known to weld a seat into openings along the conduits and to provide the sectors with a nipple at their bottom to insert into the seat to provide sealed flow communication between the sectors and the conduits. Welding seats into the openings of the conduits is undesireable; for example, the welding adds to the fabrication costs of the conduits and the seats are discarded with the conduits.

OBJECT OF THE INVENTION

It is an object of the present invention to provide a rotary disc vacuum filter with a trunnion having detachably mounted thereon a plurality of conduits for providing flow communication between the disc filter elements and the valve.

Another object is to provide a means for detachably mounting the plurality of conduits firmly and in alignment at their ends to the trunnion.

A further object is to provide means for providing a liquid seal at the open ends of the conduits.

A still further object is to accomplish mounting of the conduits to the trunnion without the use of a plurality of fasteners along the conduits or forming a portion of the conduits of flexible accordian-like material.

Yet another object is to provide a means for mounting the sectors of the disc filter elements in flow communication with the conduits.

BRIEF DESCRIPTION OF THE DRAWINGS

Further objects and advantages of the invention may be readily ascertained by reference to the following description and appended drawings, which are offered by way of description only and not in limitation of the invention, the scope of which is defined in the appended claims.

In the drawings.

DETAILED DESCRIPTION OF THE PREFERRED EMBODIMENT

Figure 1:
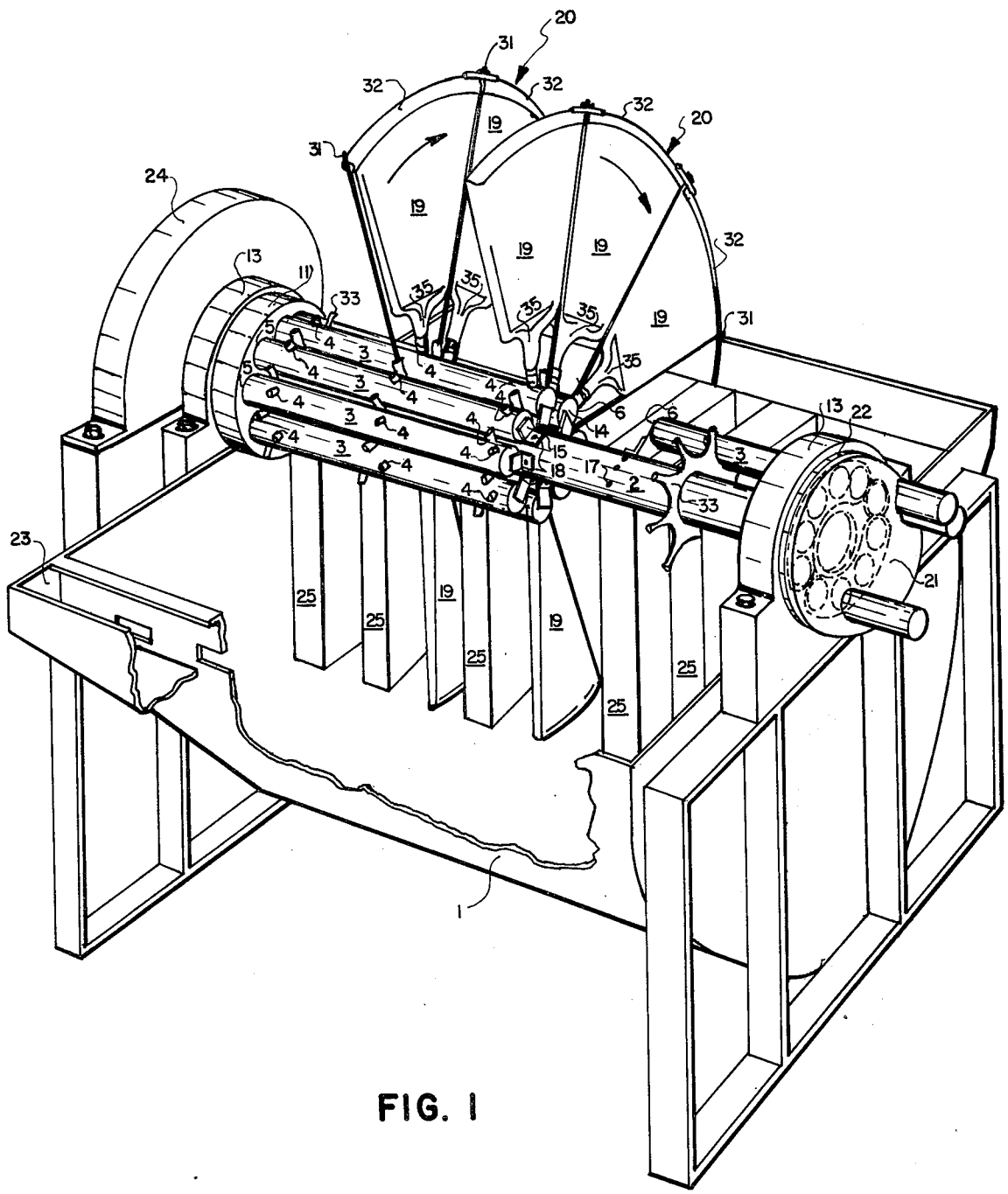
FIG. 1 is a pictorial view partially cutaway of a rotary disc vacuum filter according to the present invention.

The rotary disc vacuum filter in FIG. 1 includes a tank 1 to contain a slurry to be filtered. An elongated trunnion 2 is mounted to extend across the tank 1 for rotation about a horizontal axis.

A plurality of elongated conduits 3 is detachably-moounted adjacent both ends of each conduit 3 to the exterior sidewall of the trunnion 2 to extend lengthwise from adjacent one end of the trunnion 2. The conduits 3 of the plurality are aligned parallel to each other circumferentially about the trunnion 2 to rotate therewith. Each of the conduits 3 has an open end 5, an opposite closed end 6 and openings 4 through the sidewall of the conduits which are radially and outwardly-directed from the trunnion 2 and at equally-spaced intervals along the conduit 3.

Figure 2:
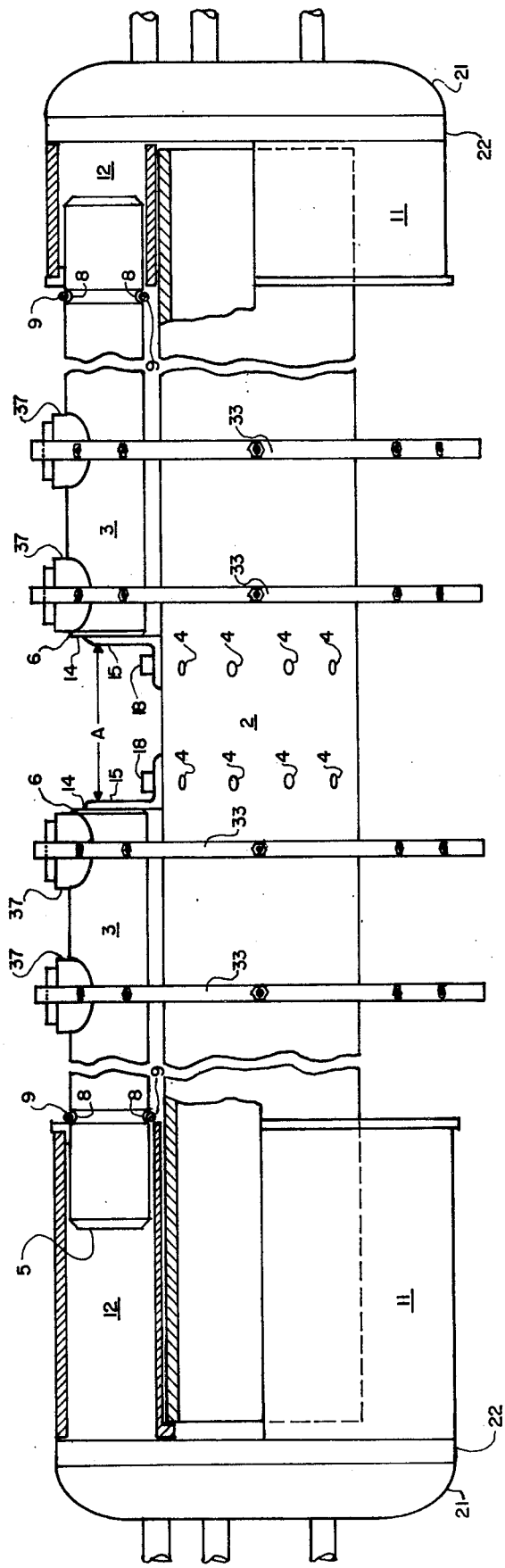
FIG. 2 is an enlarged side view again partially cutaway of the trunnion section for the rotary disc vacuum filter of FIG. 1.
Figure 5:
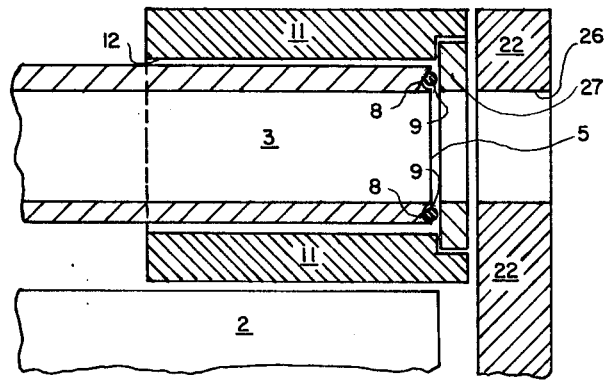
FIG. 5 is a side view of yet another alternative to the means shown in FIG. 2 for providing a seal at the open end of the conduits.

As shown in FIG. 2, a groove 8 is circumscribed in the exterior sidewall of each conduit 3 between the open end 5 and the opening 4 in the conduit 3 nearest the open end 5. Alternatively, as shown in FIG. 5 the groove 8 is cicumscribed in the face of the open end 5 of each conduit 3 between the inside and outside circumference of the sidewall of the conduit 3. The groove 8 is shaped to hold an O-ring 9 in compression to form an air and liquid seal at the flow end 5 of the conduit 3.

The conduits 3 as shown in FIG. 2, are secured to the trunnion 2 adjacent their open end 5 and their closed end 6 only. A conduit collar 11 is mounted about the trunnion 2 to rotate therewith and to secure and align the open ends 5 of the conduits 3 of the plurality. To secure and align the open ends 5, the collar 11 has a plurality of aperture 12 therethrough spaced radially from the trunnion 2 to slideably accept the open ends 5 of the conduits 3. The open ends 5 are so accepted that the O-ring 9 in the groove 8 of each conduit is compressed in one of the alternative ways shown in FIGS. 2,3,4 and 5 and described in detail hereinafter.

At the closed end 6, the conduits are sealed with a plug 14. Mounted to the plug 14 is an L-shaped clamp 15 having a hole 16 therethrough to align with a hole 17 in the trunnion 2. A screw 18 secures the holes 16 and 17 in alignment.

In a preferred embodiment, as shown in FIGS. 1 and 2, there is a first and second plurality of conduits 3. The conduits 3 of each plurality are less than half the length of the trunnion 2. The conduits 3 of the second plurality are detachably mounted to the exterior sidewall of the trunnion 2 to extend lengthwise from adjacent the end of the trunnion 2 opposite the end from which the conduits 3 of the first plurality extend. The closed ends 6 of the conduits 3 of the first plurality are adjacent the closed ends 6 of the conduits 3 of the second plurality but separated by a distance A sufficient to allow detachment of the conduits 3 of either plurality from the trunnion 2 by drawing the conduits 3 along the trunnion 2 away from the collars 11 from which they respectively extend. The open ends 5 of the conduits 3 of the first and econd plurality are respectively accepted into a first and second collar 11. The collars 11 are also part of a bearing system 13 as shown in FIG. 1 which supports the trunnion 2 on the tank 1.

A set of disc filter sectors 19 as shown in FIG. 1, are mounted to and in liquid flow communication with a corresponding one of the openings 4 of each of the conduits 3 of the plurality. The sectors 19 of the set are arranged to define an annular disc 20 which rotates with the trunnion 2 through the slurry in the tank 1.

A valve unit 21 is fixedly mounted on the tank 1 in flow communication with the open ends 5 of the conduits 3 of each plurality for selectively applying vacuum to the filter sectors 19 of the annular disc 20 via associated ones of the conduits 3. The valve unit 21 is a conventional item of a rotary disc vacuum filter and will not be further described.

Between the valve unit 21 and the collar 11, a wear plate 22 is mounted to absorb the wear resulting from the relative movement of the collar 11 and the valve unit 21 with respect to each other. The wear plate 22 also seals the flow of filtrate between the collar 11 and the valve unit 21. The wear plate 22 can be arranged to be stationary relative the collar 11 or the valve unit 21.

During operation of the rotary disc vacuum filter shown in FIG. 1, slurry is introduced through a launder 23 to the tank 1 as the trunnion 2 is rotated by a drive 24. The valve unit 21 selectively applies vacuum through the conduits to filter webbing arranged on the filter sectors 19 so that filtrate is drawn through the conduits 3 and filter cake is formed on the filter sectors 19. The filter cake is discharged at a point in the rotation of the sectors 19 into chutes 25 located in the tank 1.

Figure 3:
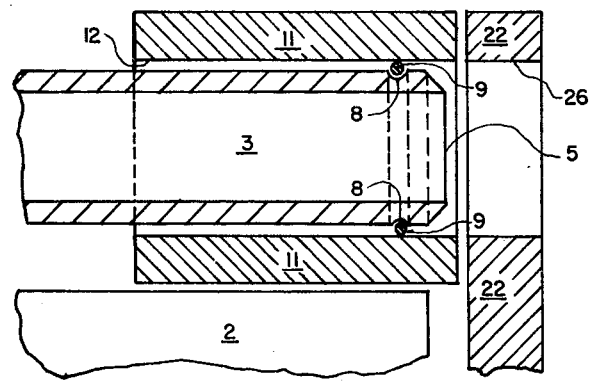
FIG. 3 is a side view of an alternative to the means shown in FIG. 2 for providing a seal at the open end of the conduits.
Figure 4:
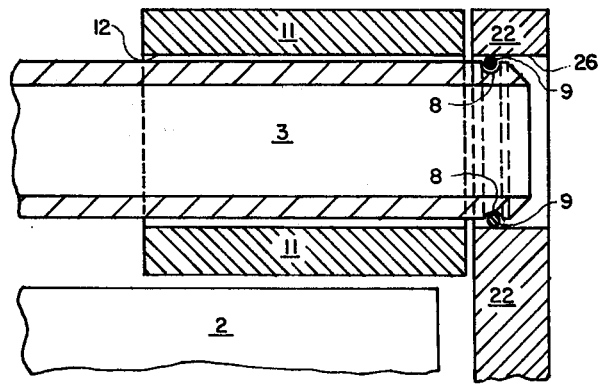
FIG. 4 is a side view of another alternative to the means shown in FIG. 2 for providing a seal at the open end of the conduits.

In more detail, the seal at the flow end 5 of the conduits 3 provided by the compression of the O-ring 9 in the groove 8 in the conduits 3 can be accomplished in a number of alternative ways as shown in FIGS. 2,3,4 and 5. In FIG. 2, the O-ring 9 is compressed between the exterior sidewall of the conduit 3 and the entrance to the aperture 12 of the collar 11. In FIG. 3, the O-ring 9 is compressed between the exterior sidewall of the conduits 3 and the wall of the aperture 12. In FIG. 4, the O-ring 9 is compressed between the exterior sidewall of the conduit 3 and the wall of an aperture 26 through the wear plate 22 which slideably accepts the conduit 3. In FIG. 5, the O-ring 9 is compressed between the face of the open end 5 of the conduit 3 and a gasket 27 positioned by the open end 5, the collar 11 and the wear plate 22.

The distance A separating the closed ends 6 of the respective first and second plurality of conduits 3 is greater than the longest length for the first or second plurality from their respective open ends 5 to the point along the conduits 3 to which the conduits 3 are slideably accepted into the aperture 12 of their respective collars 11. The distance A allows clearance for replacing individual conduits 3 by detaching the closed end 6 by removing the screw 18 from the trunnion 2 and drawing the conduit 3 along the trunnion 2 away from its collar 11.

As shown in FIG. 1, the conduits 3 are supported along their lengths at intervals corresponding to the intervals of the openings 4 by saddle structures 33 which are mounted to ring the trunnion 2. The saddle structure 33 have a plurality of U-shaped seats which contact the exterior of the conduits 3 opposite the openings 4 for approximately one-half the circumference of the conduits 3 to support and limit radially-inward and tangential movement of the conduits 3.

Radial rods 31 are mounted to the saddle structure 33 to extend radially from the trunnion 2 along the side edges of the sectors 19. Secured to the radial rods 31 are arcuate retainers 32 in contact with the outer edge of the sectors 19. The radial rods 31 and arcuate retainers 32 hold the sectors 19 in position.

Figure 6:
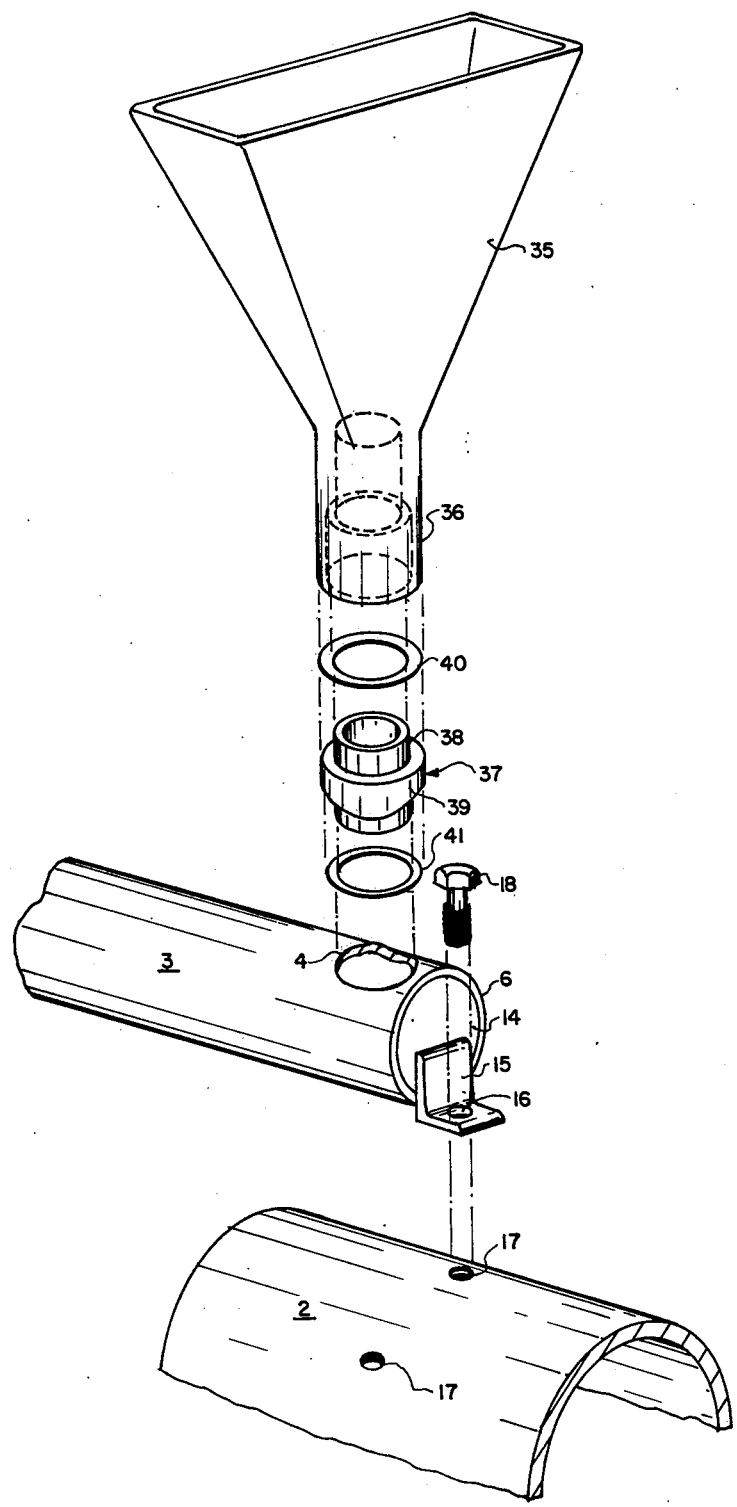
FIG. 6 is an exploded view in perspective of a detail of the machine shown in FIG. 1.

Another aspect of the present invention includes a means for mounting the sectors 19 in flow communication with the openings 4 of the conduits 3. As shown in FIGS. 1 and 6, the filter sectors 19 include a bell-shaped member 35 including a hollow stem 36 for mounting the sectors 19 in flow communication to the conduits 3.

A ferrule 37, shown in FIG. 6, is mounted between the stem 36 and the corresponding opening 4. The ferrule 37 includes an inner cylinder 38 having an open first end for insertion into the stem 36 and an open second end for insertion into the corresponding opening 4. The ferrule 37 further include a shorter outer sleeve 39 which forms a contacting sleeve over the inner cylinder 38, such that the two ends of the inner cylinder 38 project beyond the two ends of the outer sleeve 39.

The face of the end of the outer sleeve 39 toward the stem 36 is planar and defines a plane perpendicular to the longitudinal axis of the outer sleeve 39. The other face at the opposite end of the outer sleeve 39 toward the opening 4 is saddle-shaped to conform with the surface of the conduit 3 about the opening 4.

A liquid tight seal is formed between the stem 36 and the ferrule 37 by a gasket 40 fitted over the inner cylinder 38 and compressed between the planar face of the outer sleeve 39 and the face at the bottom of the stem 36. A liquid tight seal is formed between the opening 4 and the ferrule 37 by a gasket 41 fitted over the inner cylinder 38 and compressed between the saddle-shaped face of the outer sleeve 39 and the surface of the conduit 3 about the opening 4.

We claim:

1. A rotary disc vacuum filter for pressure differential filtration comprising:

a. a tank to contain a slurry to be filtered;

b. an elongated trunnion mounted to extend across said tank for rotation about a horizontal axis;

c. a first plurality of elongated conduits detachably mounted to the exterior sidewall of said trunnion to extend lengthwise from adjacent one end of said trunnion, the conduits of said first plurality being aligned parallel to each other circumferentially about said trunnion to rotate with said trunnion; each of said conduits having:
  (i) an open end;
  (ii) an opposite closed end;
  (iii) radially and outwardly-directed openings at intervals therealong; and
  (iv) a groove which circumscribes the exterior sidewall of each conduit between the open end and the nearest of said openings, the groove being shaped so as to hold an O-ring;

d. a conduit collar mounted about and to rotate with said trunnion, said collar having a plurality of aperture therethrough spaced radially about said trunnion to slideably accept the open end of each of said elongated conduits of said first plurality so that an O-ring in the groove of each of said conduits is compressed against each conduit to form an air and liquid tight seal thereat;

e. means for detachably mounting each of said elongated conduits of said fist plurality to said trunnion adjacent the closed end of each conduit;

f. a first set of disc filter sectors, each sector of said first set being mounted to and in liquid flow communication with a corresponding one of the openings of one of said elongated conduits; said sectors of said first set being arranged to define an annular disc which rotates with said trunnion through slurry in said tank; and g. valve means mounted on said tank in flow communication with the open ends of said conduits for selectively applying vacuum to said disc filter sectors of said first set via associated ones of said elongated conduits to draw filtrate from the slurry.

2. A rotary disc vacuum filter according to claim 1 wherein said conduits of said first plurality are less than half the length of said trunnion.

3. A rotary disc vacuum filter according to claim 2 further including:
  a. a second plurality of elongated conduits detachably mounted to the exterior sidewall of said trunnion to extend lengthwise from adjacent the end of said trunnion opposite the one end, the conduits of said second plurality being aligned parallel to each other circumferentially about said trunnion to rotate with said trunnion; each of said conduits having;
    (i) an open end;
    (ii) an opposite closed end;
    (iii) radially and outwardly-directed openings at intervals therealong; and
    (iv) a groove which circumscribes the exterior sidewall of each conduit between the open end and the nearest of said openings, the groove being shaped so as to hold an O-ring;
  b. a second conduit collar mounted about and to rotate with said trunnion, said collar having a plurality of apertures therethrough spaced radially about said trunnion to slideably accept the open end of each of said elongated conduits of said second plurality so that an O-ring in the groove of each of said conduits is compressed against each conduit to form an air and liquid tight seal thereat;
  c. second means for detachably mounting each of said elongated conduits of said second plurality to said trunnion adjacent said opposite end of each conduit;
  d. a second set of disc filter sectors, each sector of said second set being mounted to and in liquid flow communication with a corresponding one of said openings of one of said elongated conduits of said second plurality; said sectors of said second set being arranged to define an annular disc which rotates with said trunnion through slurry in said tank; and
  e. second valve means mounted on said tank in flow communication with said open ends of said conduits of said second plurality for selectively applying vacuum to said disc filter sectors of said second set via associated ones of said elongated conduits to draw filtrate from the slurry.

4. A rotary disc vacuum filter according to claim 3 wherein the closed ends of said respective first and second plurality of conduits are separated by a distance sufficient to allow detaching of said conduits of the respective pluralities from said trunnion by drawing said respective conduits along said trunnion away from said collars from which said respective conduits extend.

5. A rotary disc vacuum filter according to claim 4 wherein the distance between the closed ends of said respective first and second plurality of conduits is greater than the longest length for said conduits from their respective open ends to the point along said conduits to which said conduits are slideably accepted into the aperture of their respective conduit collar.

6. A rotary disc vacuum filter according to claim 1 further including a saddle structure mounted to ring said trunnion, said structure having a plurality of U-shaped seats to limit radially-inward and tangential movement of said conduits of said first plurality.

7. A rotary disc vacuum filter for pressure differential filtration comprising:
  a. a tank to contain a slurry to be filtered;
  b. an elongated trunnion mounted to extend across said tank for rotation about a horizontal axis;
  c. a first plurality of elongated conduits detachably mounted to the exterior sidewall of said trunnion to extend lengthwise from adjacent one end of said trunnion, the conduits of said first plurality being aligned parallel to each other circumferentially about said trunnion to rotate with said trunnion, each of said conduits having:
    (i) an open end;
    (ii) an opposite closed end;
    (iii) radially and outwardly-directed openings at intervals therealong; and
    (iv) a circular groove in the face of the open end of each conduit between the inside and outside circumference of each conduit, the groove being shaped so as to hold an O-ring;
  d. a conduit collar mounted about and to rotate with said trunnion, said collar having a plurality of apertures therethrough spaced radially about said trunnion to slideably accept the open end of each of said elongated conduits of said first plurality so that an O-ring in the groove of each of said conduits is compressed against each conduit to form an air and liquid tight seal thereat;

e. means for detachably mounting each of said elongated conduits of said first plurality to said trunnion adjacent the closed end of each conduit;

f. a first set of disc filter sectors, each sector of said first set being mounted to and in liquid flow communication with a corresponding one of the openings of one of said elongated conduits, said sectors of said first set being arranged to define an annular disc which rotates with said trunnion through slurry in said tank;

g. valve means mounted on said tank in flow communication with the open ends of said conduits for selectively applying vacuum to said disc filter sectors of said first set via associated ones of said elongated conduits to draw filtrate from the slurry;

h. a second plurality of elongated conduits detachably mounted to the exterior sidewall of said trunnion to extend lengthwise from adjacent the end of said trunnion opposite the one end, the conduits of said second plurality being aligned parallel to each other circumferentially about said trunnion to rotate with said trunnion, each of said conduits having;
  (i) an open end;
  (ii) an opposite closed end;
  (iii) radially and outwardly-directed opening at intervals therealong; and
  (iv) a circular groove in the face of the open end of each conduit between the inside and outside circumference of each conduit, the groove being shaped so as to hold an O-ring;

i. a second conduit collar mounted about and to rotate with said trunnion, said collar having a plurality of apertures therethrough spaced radially about said trunnion to slideably accept the open end of each of said elongated conduits of said second plurality so that an O-ring in the groove of each of said conduits is compressed against each conduit to form an air and liquid tight seal thereat;

j. a second means for detachably mounting each of said elongated conduits of said second plurality to said trunnion adjacent said opposite end of each conduit;

k. a second set of disc filter sectors, each sector of said second set being mounted to and in liquid flow communication with a corresponding one of said openings of one of said elongated conduits of said second plurality, said sectors of said second set being arranged to define an annular disc which rotates with said trunnion through slurry in said tank; and l. second valve means mounted on said tank in flow communication with said open ends of said conduits of said second plurality for selectively applying vacuum to said disc filter sectors of said second set via associated ones of said elongated conduits to draw filtrate from the slurry.

8. A rotary disc vacuum filter according to claim 7 wherein the closed ends of said respective first and second plurality of conduits are separated by a distance sufficient to allow detaching of said conduits of the respective pluralities from said trunnion by drawing said respective conduits along said trunnion away from said collars from which said respective conduits extend.

9. A rotary disc vacuum filter according to claim 8 wherein the distance between the closed ends of said respective first and second plurality of conduits is greater than the longest length for said conduits from their respective open ends to the point along said conduits to which said conduits are slideably accepted into the aperatures of their respective conduit collar.

* * * * *